United States Patent Office 3,257,452
Patented June 21, 1966

3,257,452
CONDENSATION OF BENZENE DICARBOXYLIC ACID WITH FORMALDEHYDE TO PRODUCE TETRACARBOXYDIPHENYLMETHANES
John R. Le Blanc, Dayton, and Dexter B. Sharp, Vandalia, Ohio, assignors to Monsanto Company, a corporation of Delaware
No Drawing. Filed Dec. 27, 1960, Ser. No. 78,225
5 Claims. (Cl. 260—515)

This invention relates to a new group of polyfunctional compounds and a novel process for the preparation of these new materials. More particularly, the invention relates to new polyfunctional polyaryl compounds prepared by the condensation of dicarboxyphenyl compounds with aldehydes to prepare tetracarboxydiphenylmethanes.

Polyfunctional compounds, that is, compounds which possess more than one functional group, are in great demand in the chemical industry due to their high degree of reactivity and consequent suitability as intermediates in the preparation of many important chemical products. Where the functional groups of the polyfunctional compound are separated by sufficient space in the molecule, as in the case of polyfunctional type polyaryl compounds having at least one functional group on each of the aryl nuclei, the compounds are even more desirable because of the higher degree of stability inherent in the chemical products derived from them.

Polyfunctional compounds which have functional groups distributed on more than one aryl nucleus have been prepared by various methods known in the chemical art. Many of the prior processes involve a multiplicity of complicated and expensive steps with resultant low overall yields. By-products formed in these prior art preparations of polyfunctional compounds having polyaryl type structures are numerous and complicate the purification or render the product incapable of separation.

We have discovered that polyfunctional compounds of the polyaryl type having two functional groups on each of the aryl nuclei can be prepared by heating a dicarboxyphenyl compound with an aldehyde having no α-hydrogen substituent to an elevated temperature in concentrated sulfuric acid, oleum, or liquid sulfur trioxide to effect the condensation.

It is an object of the present invention to produce a novel class of tetracarboxylic acids. It is a further object of the present invention to produce a novel class of alkali metal, alkaline earth metal, and amine salts of tetracarboxylic acids. A further object of the present invention is to produce new and novel classes of monoesters, diesters, triesters, and tetraesters of tetracarboxylic acids. Another object of the present invention is to prepare tetracarboxylic acids having important applications in the chemical industry. For example, the various esters prepared from these tetracarboxylic acids, either as partial esters or as tetraesters have valuable properties as plasticizers for polymeric resins. The tetracarboxylic acids themselves find application in the manufacture of alkyd resins in co-reaction with polyhydric alcohols and in the manufacture of polyester type resins. The salts of these tetracarboxylic acids are highly valuable as chemical intermediates for the production of surface active agents, water repellents, sequestering agents, lubricant additives, etc. These and other objects of the present invention will be discussed in greater detail hereinbelow.

The novel tetracarboxylic acids of the present invention can be illustrated by the general formula:

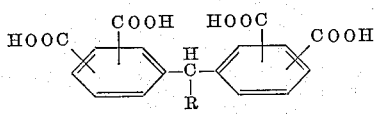

wherein R represents hydrogen, a t-alkyl radical, a cycloalkyl radical, or an aryl radical. This formula is illustrative of the essential substituents of our novel compounds. It will be understood, of course, that in many instances it will be desirable to have one or more halogen or alkyl substituents on each of the aryl nuclei. The partial and tetraesters, and the partial and tetrasalts that can be prepared from the above tetracarboxylic acids are included within the scope of our present invention.

The novel type compounds of the present invention are prepared by a condensation reaction wherein a dicarboxyphenyl compound reacts with an aldehyde selected from the aldehydes that have no α-hydrogen atoms. Suitable dicarboxyphenyl compounds include any of the three isomeric benzene dicarboxylic acids, the corresponding acid chlorides and esters of these acids, e.g., phthalic acid, isophthalic acid, terephthalic acid, phthaloyl chloride, isophthaloyl chloride, terephthaloyl chloride and the mono and diesters of these dibasic acids. Ordinarily, during the course of the condensation reaction and work-up of the product, the dibasic acid derivatives are converted to the dibasic acid. However, for reasons of convenience, and for improved solubility characteristics, it is many times convenient to charge the acid chlorides or esters to the reactor. The selection of an appropriate mono or diester is ordinarily made by taking into consideration economic factors as well as solubility characteristics. The reaction proceeds in a normal manner with such esters as monomethyl phthalate, diethyl isophthalate, di-n-propyl terephthalate, dibutyl phthalate, mono-2-ethylhexyl isophthalate, dioctyl terephthalate, etc.

The preparation of our novel tetracarboxydiphenylmethanes can be carried out using any of the three isomeric benzene dicarboxylic acids containing up to three additonal substituents attached to the benzene nucleus. We prefer dicarboxy benzene compounds that can contain up to 3 substituents attached to the benzene nucleus, where said substituents are preferably selected from the group consisting of alkyl radicals of up to about 12 carbon atoms, and halide radicals where the halide is chloride, bromide or iodide. It will be understood that the substituted acid chlorides, monoesters, and diesters can also suitably be used. In the preparation of our novel compounds, we can use for example: 2,4,6-trichloroisophthalic acid, 2,4-dibromoisophthalic acid, dimethyl 2-iodoisophthalate, dibutyl 2-methyl-4,6-dichloroisophthalate, isopropyl 2-bromo-4,6-dimethylisophthalate, 2,4,6-tributylisophthalic acid, 2,4-dihexylisophthalic acid, dibutyl 2-dodecylisophthalate, 2,4-dichloroisophthaloyl chloride, 2-decyl-4-chloro-isophthaloyl chloride. These representative compounds are merely illustrative of our preferred reactants. The corresponding derivatives of phthalic acid, phthalic anhydride, and terephthalic acid can be used as reactants in preparing our novel compounds.

Our invention is broadly applicable to the condensation of a dicarboxy benzene compound with an aldehyde having no activated hydrogen atom in the α-position to the carbonyl group. A preferred aldehyde within this classification is formaldehyde or one of its equivalents such as paraformaldehyde, trioxymethylene, or dimethoxymethane. Among the other aldehydes that can be used in the practice of our invention are such substances as trimethylacetaldehyde, $(CH_3)_3CCHO$, benzaldehyde, nuclear substituted benzaldehydes, etc.

The novel compounds of our invention can be prepared by means of a condensation reaction, as described herein below. However, within the scope of our invention, we do not limit the production of our novel polyfunctional compound to a single process for their preparation. These materials generally can not be prepared by an oxidation reaction. The attempted oxidation of a tetraalkyldiphenylmethane results in an attack by the oxidizing agent on the substituted methane with a resultant production of a mixture of miscellaneous oxidation products.

Generally, the condensation of the dicarboxy benzene compound with the aldehyde, containing no hydrogen atoms alpha to the carbonyl group, is effected in a concentrated sulfuric acid medium. We prefer to employ a concentrated sulfuric acid solution containing at least 90% sulfuric acid. We have further found that the reaction proceeds rapidly in 100% sulfuric acid which contains dissolved sulfur trioxide. These materials are commonly referred to as oleum, for example 10% oleum refers to 100% sulfuric acid containing 10% free sulfur trioxide. The condensation reaction can be conveniently conducted in oleum containing from about 10% to about 65% free $SO_3$. If desired, the reaction can be conducted in liquid 100% $SO_3$ although operation must of necessity be conducted in a pressure vessel to contain the low boiling sulfur trioxide in the liquid phase.

The condensation reaction can be conducted at any temperature within the range of about 50° C. to about 250° C. Of course, at the lower temperature, the time required will be unduly lengthened. We prefer to carry out the reaction within about 100° C. to about 200° C., more preferably in the temperature range from about 100° C. to about 150° C.

The use of stoichiometric quantities of the dicarboxy benzene compound and the aldehyde are desirable; however, since an excess of either reactant is readily recoverable, the proportion of reactants used in the original reaction mixture is immaterial. For best yields, however, it is preferred to employ about 2 moles of the dicarboxy benzene compound per mole of the aldehyde. The heating period is comparatively unimportant, some of the tetracarboxydiphenylmethane compound being formed as soon as the reactants are contacted with the oleum medium. Optimum yields of the tetracarboxydiphenylmethane compound are obtained by conducting the heating for a time of, say, 2 hours to about 20 hours.

We have further discovered that our novel tetracarboxylic acids can be used in the preparation of another series of novel polyfunctional compounds. We can use reducing agents such as $LiAlH_4$ to reduce either the tetracarboxylic acids or the tetraesters derived from these acids to prepare the corresponding tetramethyloldiphenylmethanes or we can use $LiBH_4$ with the tetraalkyl esters to prepare these same compounds. While we prefer to use lithium aluminum hydride or lithium borohydride for this reductive step, other well known reducing agents such as copper chromite can also be used. The tetramethyloldiphenylmethanes prepared by this reductive step can be used in the preparation of alkyd type resins, they can be used in the preparation of polyesters by reaction with polybasic acids, and they have also found application in the preparation of surface active agents, for example, by reaction with ethylene oxide, propylene oxide, or by reaction with small quantities of propylene oxide followed by higher proportions of ethylene oxide.

In order to illustrate some of the various aspects and advantages of the invention, representative examples are given herein. It will of course, be understood that variations in the particular starting materials, acid concentrations, reaction times and reaction temperatures and the like can be made without departing from the invention.

Example 1

A glass reactor equipped with a condenser and thermowell was charged with 100 ml. of 20% oleum, 33 g. (0.20 mole) isophthalic acid and 3.1 g. (0.10 mole) paraformaldehyde. This mixture was maintained at a temperature between 110 and 119° C. for 6 hours, cooled and then poured into ice water. The crude mixture which was recovered by filtration, was dissolved in 200 ml. methanol and saturated with HCl gas. During a refluxing period of about 30 minutes, a large quantity of solid precipitated. The mixture was cooled to 10° C. and filtered to recover the tetramethyl ester of bis(isophthalic acid)methane, M.P. 196–198° C. The tetramethylester was washed with cold methanol and recrystallized from zene to give the purified product, melting at 199–200° C. This product, 3,3′,5,5′-tetracarbomethoxydiphenylmethane analyzed as follows:

Calculated for $C_{21}H_{20}O_8$: C, 63.0; H, 5.0; saponification equivalent, 100. Found: C, 63.17; H, 5.34; saponification equivalent, 100.

The nuclear magnetic resonance spectrum was consistent with the proposed structure. In this run the yield of 3,3′,5,5′-tetracarbomethoxydiphenylmethane was 84% based on the charge of isophthalic acid.

Example 2

A sample of the tetramethyl ester prepared in Example 1 was dissolved in concentrated sulfuric acid and warmed on a steam bath for 30 minutes. The resulting solution was then poured into cold water and the precipitated crude acid filtered off. The product was further saponified to give an essentially quantitative yield of 3,3′,5,5′-tetracarboxydiphenylmethane which analyzed as follows:

Calculated for $C_{17}H_{12}O_8$: C, 59.3; H, 3.49; neutralization equivalent, 86. Found: C, 59.3; H, 3.65; neutralization equivalent 86.

This tetracarboxylic acid had a melting point of 346–350° C.

Example 3

This run was carried out to demonstrate the effect of increasing the proportion of formaldehyde to the dicarboxylic phenyl compound. A small glass reactor was charged with 100 ml. 20% oleum, 33.2 g. (0.20 mole) isophthalic acid and 6.2 g. (0.20 mole) paraformaldehyde. The reactants were heated for 6 hours at 115–120° C., cooled, and then poured into a large excess of ice water. The precipitate was filtered, washed with distilled water and dried on a vacuum oven. Unreacted isophthalic acid was separated by converting the entire crude product to methyl esters whereupon the tetramethyl ester precipitated from a methanol solution and the dimethyl isophthalate remained in solution as described in Example 1.

Tetramethyl ester of bis(isophthalic acid)methane of melting point 196–198° C. was obtained as previously described. In this run the yield of the tetramethyl ester was increased slightly to 85.5% based on the charge of isophthalic acid.

Example 4

In this example, a mixture of 200 ml. 100% sulfuric acid, 66.5 g. (0.40 mole) isophthalic acid and 6.4 g. (0.20 mole) paraformaldehyde were heated at 117–122° C. for 5 hours. The reactants were cooled and then pured into an excess of ice water. The crude product which precipitated was filtered, washed with distilled water and dried in a vacuum oven to obtain 68 g. of material. The reaction product was converted to methyl esters by reaction in methanol with hydrogen chloride whereupon the tetramethyl ester precipitated from methanol as described in Example 1. This product was purified by recrystallization from cyclohexanone and dried to obtain a diminished yield of 3,3′,5,5′ - tetracarbomethoxydiphenylmethane, melting point 196–198° C.

During the preparation of the tetramethyl ester in methanol, it has been observed that by-product dimethyl isophthalate remains dissolved in methanol and the tetramethyl ester, the desired product, precipitates in essentially quantitative yield from the solution. In one preferred method for the practice of the invention, we charge the dimethyl isophthalate directly to the initial reaction. In the concentrated sulfuric acid or oleum medium the ester may be hydrolyzed to the acid which then participates in the condensation reaction in the normal manner.

Example 5

A small steel autoclave was charged with 75 ml. 20% oleum, 28.1 g. (0.145 mole) dimethyl terephthalate and 4.6 g. (0.145 mole) paraformaldehyde. The bomb was sealed and immersed in an oil bath at 156–160° C. for 3 hours and 45 min. During this interval thorough mixing was maintained by vigorous vibration of the autoclave. The reactor was cooled and the contents poured into an excess of ice water. The crude product which precipitated was filtered and thoroughly washed with water and then dried in a vacuum oven. The product was then dissolved by heating with excess absolute ethanol in the presence of a stream of hydrogen chloride gas. The reactants were maintained at reflux for 30 minutes and then cooled. The precipitate which separated was filtered off, washed with cold ethanol and dried in a vacuum oven. The product, a mixed methyl, ethyl ester of bis(terephthalic acid)methane, weight 13.5 g., melting point 145–151° C., gave the following elemental analysis:

Calculated for $C_{25}H_{28}O_8$: C, 64.8; H, 6.14; saponification equivalent, 114. Found: C, 64.0; H, 4.97; saponification equivalent, 103; neutralization equivalent, 0.0.

Example 6

In this example, the procedure as outlined in Example 5 was followed, except that instead of 20% oleum, 75 ml. of 65% oleum was charged to the autoclave along with the dimethyl terephthalate and paraformaldehyde. In this run an improved yield of 19.8 g. of the mixed methyl, ethyl ester of bis(terephthalic acid)methane of melting point 149–153° C. was obtained. This product gave the following elemental analysis:

Calculated for $C_{25}H_{28}O_8$: C, 64.8; H, 6.14; saponification equivalent, 114. Found: C, 63.84; H, 5.00; saponification equivalent, 103.

Example 7

It has been demonstrated that the tetramethyl esters of our novel tetracarboxylic acids can be readily prepared by heating the acid with excess methanol in the presence of gaseous hydrogen chloride. The tetramethyl ester of any particular acid can then be converted to other alkyl esters by an ester interchange reaction. By this means, mixed esters can be prepared as well as other higher esters.

A distillation pot was charged with 100 ml. of n-butanol and 20.0 g. of the tetramethyl ester of bis(isophthalic acid)methane and the solution saturated with hydrogen chloride gas. This reactor was then attached to a 15 inch distillation column equipped with a reflux head and the reactants heated to reflux. Methanol, liberated by the ester interchange reaction, was removed from the system operating at reflux temperature. During an interval of 2 hours the pot temperature slowly climbed from 105° C. to 121° C. and the reflux temperature at the head, climbed from 60° C. to 117° C. as part of the combined methanol was liberated and removed from the system.

Excess butanol was then stripped off under reduced pressure and the crude tetrabutyl ester was dissolved in benzene, washed with water, dilute aqueous sodium bicarbonate solution and additional portions of water. The benzene solution was then treated with activated charcoal to remove color forming impurities. The charcoal was filtered off and the benzene evaporated at reduced pressure. An esentially quantitative yield of product was obtained. Elemental analytical data indicate that the tetrabutyl ester of bis(isophthalic acid)methane was contaminated with partial methyl ester. The viscous product had an extremely low vapor pressure at room temperature and appears to be particularly useful as a low volatility type plasticizer for vinyl type polymer, e.g., polyvinyl chloride. Analytical data for this butyl ester is as follows:

Calculated for $C_{33}H_{44}O_8$: C, 69.8; H, 7.75. Found: C, 67.5; H, 7.0.

The calculated saponification equivalent for the tetrabutyl ester is 142, and 100 for the tetramethyl ester; the mixed ester was found to have a saponification equivalent of 126, thus indicating a 62% average butyl and 38% methyl ester content for the mixed ester.

Example 8

The ester interchange reaction between the tetramethyl esters of our tetrabasic acids and other higher alcohols, as described in Example 7 can be used in the preparation of any higher esters. In this run, the interchange reaction was conducted in the presence of excess 2-ethylhexanol using hydrogen chloride as catalyst.

A charge of 100 ml. of 2-ethylhexanol, 18.5 g. of the tetramethyl ester of bis(isophthalic acid)methane was saturated with hydrogen chloride and charged to a distillation set-up. As the interchange reaction proceeded at a temperature within the reaction pot from 100° C. to 187° C., methanol which was liberated was removed from the system during an interval of 2 hours and 45 minutes. The resulting 2-ethylhexyl ester was isolated and purified as described above. This extremely viscous ester, having extremely low vapor presures at normal temperatures, is of particular interest as a plasticizer for vinyl type resins. This ester was submitted for elemental analysis with the following results:

Calculated for $C_{49}H_{76}O_8$: C, 74.3; H, 9.6; saponification equivalent, 198. Found: C, 70.3; H, 8.3; saponification equivalent, 152.

The saponification equivalent data indicate 54% of the ester exists as the 2-ethylhexyl ester and 47% as methyl ester.

Thus, a mixed methyl, 2-ethylhexyl ester was obtained. By modifications of this procedure, i.e., longer reaction times, excess charge of higher alcohol of from about 2 to 13 carbon atoms, etc., various mixed esters can be prepared. The ester interchange reaction can also be conducted in the presence of a basic catalyst. In many instances the use of alkaline materials, instead of an acidic catalyst, results in a nearly quantitative conversion to the desired higher-alkyl ester.

In many instances to obtain desired solubility and volatility properties we vary the ratio of methyl ester to higher alkyl ester content. For example, we can convert the novel tetracarboxydiphenylmethanes to mono-methyl tri-higher-alkyl esters, di-methyl di-higher-alkyl esters, and tri-methyl mono-higher-alkyl esters, where alkyl represents a hydrocarbon radical of from 2 to 13 carbon atoms. It will be understood that the esters can also be aralkyl esters such as those prepared from benzyl alcohol, phenethyl alcohol, etc., and such esters are included within the purview of our invention.

Example 9

A sample of the mixed methyl and ethyl esters of bis(terephthalic acid)methane prepared in Example 5, 6.0 g., was refluxed in aqueous KOH solution to saponify the esters. After an extended reflux the reaction mixture was cooled, and acidified to precipitate the crude tetracarboxylic acid. The acid, crystallized from dimethylformamide, M.P. 292–4° C. analyzed as follows:

Calculated for $C_{17}H_{12}O_8$: C, 59.3; H, 3.49; neutralization equivalent, 86. Found: C, 60.3; H, 3.53; neutralization equivalent 87.

The analogous tetracarboxylic acid derived from phthalic acid and a source of formaldehyde can also be prepared following the procedures described above, the bis(phthalic acid)methane is more difficult to obtain in a highly purified condition due to the similar solubility characteristics of the phthalic acid and the tetracarboxylic acid.

The esters of our novel polyfunctional compounds are conveniently prepared by ester interchange since in one preferred procedure the tetramethyl ester is prepared during the isolation and purification of the products from the condensation reaction. However, it will be understood that the tetracarboxylic acid can be converted to a tetraester in the presence of an acidic catalyst, e.g., benzenesulfonic acid, in esentially quantitative conversion.

While the invention has been described with particular reference to preferred embodiments thereof, it will be appreciated that variations from the details given herein can be effected without departing from the invention in its broadest aspects.

We claim:

1. The process for the preparation of a tetracarboxydiphenylmethane which comprises heating from 2 hours to about 20 hours at 100° C. to about 200° C. a dicarboxyphenyl compound with a source of formaldehyde selected from the group consisting of formaldehyde, paraformaldehyde, trioxymethylene, and dimethoxymethane, in a concentrated sulfuric acid medium.

2. The process of heating from 2 hours to about 20 hours at 100° C. to about 200° C., a compound selected from the group consisting of benzene dicarboxylic acids and derivatives of said benzene dicarboxylic acids with a source of formaldehyde selected from the group consisting of formaldehyde, paraformaldehyde, trioxymethylene, and dimethoxymethane in a concentrated sulfuric acid medium to prepare a tetracarboxydiphenylmethane.

3. The process of claim 2 wherein the sulfuric acid medium is a concentrated sulfuric acid solution containing at least 90% sulfuric acid.

4. The process for the preparation of 3,3′,5,5′-tetracarboxydiphenylmethane which comprises heating from 2 hours to about 20 hours at 100° C. to about 200° C. a compound selected from the group consisting of isophthalic acid and isophthalic acid derivatives with a source of formaldehyde in an acid medium of concentrated sulfuric acid of at least 90% sulfuric acid strength.

5. The process for the preparation of bis(terephthalic acid)methane which comprises heating from 2 hours to about 20 hours at 100° C. to about 200° C. a compound selected from the group consisting of terephthalic acid, and the esters and acid chlorides of terephthalic acid with a source of formaldehyde in an acid medium of sulfuric acid of at least 90% sulfuric acid content.

References Cited by the Examiner

UNITED STATES PATENTS 2,712,543 7/1955 Gresham et al. _____ 260—346.3

FOREIGN PATENTS 416,544 7/1925 Germany.

OTHER REFERENCES

Le Blanc et al., "J. Org. Chem." vol. 26 (1961), pages 4731 to 4733.

Welch et al., "J. Am. Chem. Soc." vol. 73, pages 4391–3 (1951).

LORRAINE A. WEINBERGER, *Primary Examiner.*

CHARLES B. PARKER, LEON ZITVER, *Examiners.*